US011434152B2

(12) United States Patent
Nelson et al.

(10) Patent No.: US 11,434,152 B2
(45) Date of Patent: Sep. 6, 2022

(54) METHOD FOR INCREASING THE MAGNESIUM ION CONCENTRATION IN FEED WATER

(71) Applicant: OMYA INTERNATIONAL AG, Oftringen (CH)

(72) Inventors: Nicholas Charles Nelson, Zurich (CH); Marius Schmid, Muttenz (CH)

(73) Assignee: OMYA International AG, Oftringen (CH)

( * ) Notice: Subject to any disclaimer, the term of this patent is extended or adjusted under 35 U.S.C. 154(b) by 324 days.

(21) Appl. No.: 16/629,868

(22) PCT Filed: Jul. 10, 2018

(86) PCT No.: PCT/EP2018/068678
§ 371 (c)(1),
(2) Date: Jan. 9, 2020

(87) PCT Pub. No.: WO2019/011921
PCT Pub. Date: Jan. 17, 2019

(65) Prior Publication Data
US 2021/0147267 A1    May 20, 2021

Related U.S. Application Data
(60) Provisional application No. 62/534,269, filed on Jul. 19, 2017.

(30) Foreign Application Priority Data

Jul. 12, 2017 (EP) ..................................... 17181019

(51) Int. Cl.
| C02F 1/68 | (2006.01) |
| A23L 33/16 | (2016.01) |
| C02F 1/66 | (2006.01) |
| C02F 1/44 | (2006.01) |

(52) U.S. Cl.
CPC ................ *C02F 1/68* (2013.01); *A23L 33/16* (2016.08); *C02F 1/66* (2013.01); *A23V 2002/00* (2013.01); *C02F 1/441* (2013.01); *C02F 2201/006* (2013.01)

(58) Field of Classification Search
CPC .... C02F 1/68; C02F 1/66; C02F 1/441; C02F 2201/006; A23L 33/16; A23V 2002/00
USPC .............................................. 426/426.74, 66
See application file for complete search history.

(56) References Cited

U.S. PATENT DOCUMENTS

2011/0100890 A1*  5/2011  Brotman
2014/0014582 A1   1/2014  Muro et al.

FOREIGN PATENT DOCUMENTS

| AU | 2003218888 B2 | 10/2003 |
| CN | 101687648 | * 1/2015 |
| EP | 3034474 A1 | 6/2016 |
| EP | 3202719 A1 | 8/2017 |
| KR | 2011003952 A | 1/2011 |
| RU | 2131847 C1 | 6/1999 |
| RU | 2464237 C2 | 10/2012 |
| WO | 2009135113 A1 | 11/2009 |
| WO | 2012020056 A1 | 2/2012 |
| WO | 2013014026 A1 | 1/2013 |
| WO | 2013030185 A1 | 3/2013 |
| WO | 2013034396 A1 | 3/2013 |
| WO | 2013113614 A1 | 8/2013 |
| WO | 2013113805 A1 | 8/2013 |
| WO | 2013113807 A1 | 8/2013 |
| WO | 2014187613 A1 | 11/2014 |
| WO | 2014187666 A1 | 11/2014 |

OTHER PUBLICATIONS

Berninger, U. N., "The experimental determination of hydromagnesite precipitation rates at 22.5-75 C.", Mineralogical magazine, No. 2014, vol. 78(6), pp. 1405-1416. (Year: 2014).*
Paul Sabatier, "On the Reactivity of Mg-Carbonates", Universite de Toulouse, Jun. 7, 2016, 189 pages.
Blog by iSpring Water Systems, "Why Reverse Osmosis Water is Acidic?", Jun. 19, 2021, 3 pages.
Doelter et al., "Handbuch Der Mineralchemie", Springer-Verlag Berlin Heidelberg GMBH, 1912, 3 page.
Communication Pursuant to Article 94(3) EPC for Application No. 18 737 280.0, dated May 11, 2021, 6 pages.
A. Botha et al., "Preparation of a magnesium hydroxy carbonate from magnesium hydroxide", Hyrometallurgy 62 (2001), pp. 175-183.
Sabatier, Paul et al; "On the Reactivity of Mg-Carbonates", Universite de Toulouse; Jun. 7, 2016.†

* cited by examiner
† cited by third party

*Primary Examiner* — Helen F Heggestad
(74) *Attorney, Agent, or Firm* — Fay Sharpe LLP

(57) ABSTRACT

The present invention relates to a method for increasing the magnesium ion concentration of feed water. The method comprises the steps of providing an inlet flow of feed water $Q_{IN}$ and passing said flow $Q_{IN}$ through a solid bed comprising a magnesium ion source to obtain an outlet flow of treated water $Q_{OUT}$ having an increased concentration of magnesium ions. The invention further relates to a water treatment system for increasing the magnesium ion concentration of feed water and a corresponding flow reactor.

20 Claims, No Drawings

METHOD FOR INCREASING THE MAGNESIUM ION CONCENTRATION IN FEED WATER

The present invention relates to a method for increasing the magnesium ion concentration of feed water. The inventive method is suitable for use in domestic installations, for example domestic water supply systems or water dispensers. The invention further relates to a water treatment system for increasing the magnesium ion concentration of feed water and a corresponding flow reactor.

Magnesium is one of the most important minerals for the body. Magnesium plays an essential role in almost every organ, in particular the heart, muscles and kidney. It is the fourth most abundant cation in the body, and the second most intracellular fluid.

Magnesium deficiency has been scientifically proven to either trigger or cause the following health problems: heart disease, diabetes, migraine, anxiety, hypertension, depression, fatigue, blood clots, liver disease, kidney disease, osteoporosis, insomnia, fatigue, cystitis, nerve problems and hypoglycaemia.

One of the most important sources of magnesium is drinking water, wherein surface fresh water and groundwater are important sources of drinking water.

However, natural drinking water has become scarce and many reservoirs, even in water-abundant areas, are threatened by a dramatic deterioration of the drinking water quality. Therefore, the treatment of seawater, brine, brackish water, waste water and contaminated effluent water is gaining more and more importance for both, environmental and economic reasons. Demineralization or deionization processes, by which drinking water is produced, for example, from sea water or brackish water, remove almost all dissolved ions, including essential minerals such as magnesium.

Remineralization processes are therefore required to reintroduce these essential minerals in order to make demineralized or deionized water suitable for human consumption. However, depending on the mineral composition of natural drinking water, it may also be necessary to increase the concentration of specific minerals, in particular magnesium, in order to ensure sufficient mineral supply.

Current techniques for remineralization include calcite contactors and lime dosing systems, but these concern themselves with the replenishment of calcium ions and alkalinity only: For example, WO 2012/020056 A1 discloses a process for treating water and the use of micronized calcium carbonate in such a process. Specifically, said process comprises the steps of providing feed water, and injecting both gaseous carbon dioxide and a slurry comprising micronized calcium carbonate into said feed water. WO 2013/030185 is directed to a process for remineralization of water comprising the steps of providing feed water, providing an aqueous solution of calcium carbonate, wherein the aqueous solution of calcium carbonate comprises dissolved calcium carbonate and reaction species thereof, and combining the feed water and the aqueous calcium carbonate solution.

Further patent applications directed to water remineralization processes and systems include WO 2013/014026 A1, WO 2013/113805 A1, WO 2013/113807 A1, WO 2013/113614 A1, WO 2014/187666 A1, and WO 2014/187613 A1. Moreover, the applicant would like to mention unpublished European patent applications no. 16 154 567.8 and no. 16 154 570.2.

Currently there are only a few processes that are concerned with the replenishment of magnesium. However, the use of highly soluble magnesium salts involves high costs and the reintroduction of unwanted anions such as chloride or sulfate.

Accordingly, there is a general need for improved and cost-saving methods for magnesium replenishment.

In this regard, WO 2009/135113 A1 relates to a water treatment system comprising a reverse osmosis filter, a manifold for delivering water to be treated to said reverse osmosis filter, a replaceable cartridge containing a granular or solid magnesium compound, a storage tank to accumulate at least partially treated water, a dispenser for dispensing treated water from said treatment system, and a second filter that is in fluid communication with said storage tank and having an outlet in fluid communication with a said dispenser.

WO 2013/034396 A1 discloses a process for purifying water, wherein said process comprises a stage of purification and a stage of remineralization. The latter may be performed by passing reverse osmosis water through a cartridge comprising calcium carbonate and magnesium carbonate at a ratio of from 95:5 to 60:40.

US 2014/0014582 A1 discloses a process which uses magnesium minerals, e.g. magnesium oxide, in combination with carbon dioxide. However, the process requires divided flows $Q_1$ and $Q_2$ and the direct dosing of the reagents (mineral and carbon dioxide) which, in turn, requires a filtration step.

In view of the foregoing, there is still a need for the provision of methods and corresponding treatment systems for increasing the magnesium ion concentration.

In this respect, one object of the present invention may be seen in the provision of a method for increasing the magnesium ion concentration which avoids the use of highly water-soluble magnesium salts, thereby avoiding the introduction of unwanted anions, such as chloride or sulfate. In this regard, it may also be desirable to produce drinking water having an acceptable turbidity, preferably $\leq 1.0$ NTU.

Another object of the present invention may be seen in the provision of a method for increasing the magnesium ion concentration, wherein the method allows for faster dissolution of the magnesium ion source compared to conventional methods. Still another object may thus be seen in the provision of a method which allows for shorter contact times between the magnesium ion source and the feed water to be remineralized. In turn, another object of the present invention may be seen in the size reduction of the installation or a reduction of the plant foot print. In this regard, one further object may be seen in the provision of a less complex water treatment system. One particular aim may be seen in avoiding the introduction or injection of carbon dioxide.

Still another object may be seen in the provision of a method for increasing the magnesium ion concentration of feed water, wherein the method allows for a more precise adjustment of the final magnesium concentration.

Another object of the present invention may be seen in the provision of a water treatment method and a corresponding water treatment system which may be used in domestic water supply systems or water dispensers.

Finally, still another object of the present invention may be seen in the provision of a method and corresponding system for increasing the magnesium ion concentration which may be used with any kind of feed water, including drinking water having a low magnesium concentration, demineralized or deionized water (e.g., water from reverse osmosis), or partially remineralized water.

The foregoing and other problems may be solved by the subject-matter as defined herein in the independent claims.

A first aspect of the present invention relates to a method for increasing the magnesium ion concentration of feed water, the method comprising the following steps:
(a) providing an inlet flow of feed water $Q_{IN}$;
(b) passing said flow $Q_{IN}$ through a solid bed to obtain an outlet flow of treated water $Q_{OUT}$;
characterized in that the solid bed in step (b) comprises a magnesium ion source in the form of solid particles, wherein said magnesium ion source is natural or synthetic hydromagnesite.

The inventors of the present application surprisingly found that passing an inlet flow of feed water having a low magnesium content through a fixed bed comprising solid hydromagnesite particles leads to a rapid and effective replenishment of magnesium. The inventive process offers great flexibility as it may be used to mineralize both, deionized or demineralized water and mineralized water lacking (sufficient) magnesium. In addition, the inventive method allows for a precise and reliable dosage of magnesium while avoiding the introduction of unwanted anions, such as chloride or sulfate. The treated water obtainable by the inventive method is well suitable as drinking water, for example in terms of alkalinity, turbidity and especially mineral composition.

Another aspect of the present invention relates to a corresponding water treatment system for carrying out the inventive process. Said system comprises:
(i) a line, the line being configured to receive an inlet flow of feed water $Q_{IN}$; and
(ii) a solid bed, the solid bed being configured to receive the inlet flow of feed water $Q_{IN}$ from said line to obtain an outlet flow of treated water $Q_{OUT}$;
characterized in that the solid bed comprises a magnesium ion source in the form of solid particles, wherein said magnesium ion source is natural or synthetic hydromagnesite.

Accordingly, still another aspect relates to a flow reactor, such as a flow cartridge, which may be used in the water treatment system comprising:
(i) an inlet, the inlet being configured to receive an inlet flow of feed water $Q_{IN}$;
(ii) a solid bed, the solid bed being configured to receive the inlet flow of feed water $Q_{IN}$ from said inlet and to obtain an outlet flow of treated water $Q_{OUT}$; and
(iii) an outlet being configured to release the outlet flow of treated water $Q_{OUT}$;
characterized in that the solid bed comprises a magnesium ion source in the form of solid particles, wherein said magnesium ion source is natural or synthetic hydromagnesite.

The following terms used throughout the present application shall have the meanings set forth hereinafter:

The "feed water" in the meaning of the present invention may be any type of water that is essentially free from impurities, preferably free from impurities, and contains no or only low concentrations of magnesium ions. More preferably, the feed water is essentially free from or free from pathogens and dirt particles. Non-limiting examples include tap water or deionized water. In one embodiment, the feed water has a concentration of dissolved magnesium ions of 10 mg/l or less, preferably 5 mg/l or less, and most preferably 2 mg/l or less.

The term "solid bed" (sometimes referred to as "packed bed" or "fixed bed") used herein is well-known to the skilled person in the field of water treatment. Typically, such a solid bed is composed of a particulate material, i.e. plurality of solid particles, said particles representing a first phase in solid physical state, and being arranged such as to allow to pass a reactant flow, representing a second phase in liquid or gaseous physical state, thereby contacting the particles of the solid bed and the reactant flow.

The term "solid" according to the present invention refers to a material that is solid under standard ambient temperature and pressure (SATP) which refers to a temperature of 298.15 K (25° C.) and an absolute pressure of exactly 100 kPa. The solid may be in the form of a powder, tablet, granules, flakes etc. Accordingly, the term "liquid medium" refers to a material that is liquid under standard ambient temperature and pressure (SATP) which refers to a temperature of 298.15 K (25° C.) and an absolute pressure of exactly 100 kPa.

The term "particulate" in the meaning of the present application refers to materials composed of a plurality of "particles". In general, such a plurality of particles may be defined, for example, by its particle size distribution.

The "particle size" of a particulate material, such as the particles forming the solid bed of the present invention, herein is described by its weight distribution of particle sizes, generally referred to as $d_x(wt)$. The "weight median particle size" means that 50 wt % of all particles are smaller than that particle size. The weight median particle size may also be referred to as $d_{50}$ (wt).

A "magnesium ion source" in the meaning of the present application may be any material which, upon contact with water, is capable of releasing magnesium ions. Non-limiting examples of suitable magnesium ion sources include magnesium minerals and magnesium salts.

The "solubility limit" of a specific solute is the mass concentration of said solute being in dissolved state within a saturated solution or system of a given solvent (e.g. water) and under given conditions, preferably at 20° C. and 100 kPa. Where reference is made to the solubility limit in water, deionized water may be preferred.

The total alkalinity ($CaCO_3$) as referred to herein (sometimes referred to as TAC) is a measure of the ability of an aqueous solution to neutralize acids to the equivalence point of carbonate or bicarbonate. The alkalinity is equal to the stoichiometric sum of the bases in solution and is specified in mg/l (as $CaCO_3$). The alkalinity may be measured by titration with a titrator.

The "Langelier Saturation Index" (LSI) as used herein describes the tendency of an aqueous liquid to be scale-forming or corrosive, with a positive LSI indicating scale-forming tendencies and a negative LSI indicating a corrosive character. A balanced Langelier Saturation Index, i.e. LSI=0, therefore means that the aqueous liquid is in chemical balance. The LSI is calculated as follows:

$$LSI = pH - pH_S$$

wherein pH is the actual pH value of an aqueous system and $pH_S$ is the pH value of the aqueous system at $CaCO_3$ saturation. The $pH_S$ can be estimated as follows:

$$pH_S = (9.3 + A + B) - (C + D)$$

wherein A is the numerical value indicator of total dissolved solids (TDS) present in the aqueous liquid, B is the numerical value indicator of temperature of the aqueous liquid in K, C is the numerical value indicator of the calcium concentration of the aqueous liquid in mg/l of $CaCO_3$, and D is the numerical value indicator of alkalinity of the aqueous liquid in mg/l of $CaCO_3$. The parameters A to D are determined using the following equations:

$$A = (\log_{10}(TDS) - 1)/10$$

$$B = -13.12 \times \log_{10}(T+273) + 34.55$$

$$C = \log_{10}[Ca^{2+}] - 0.4$$

$$D = \log_{10}(TAC)$$

wherein TDS are the total dissolved solids in mg/l, T is the temperature in ° C., $[Ca^{2+}]$ is the calcium concentration of the aqueous liquid in mg/l of $CaCO_3$, and TAC is the total alkalinity of the aqueous liquid in mg/l of $CaCO_3$.

Where an indefinite or definite article is used when referring to a singular noun, e.g. "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" though such a limited understanding is always included by the terms "obtained" or "defined" as a preferred embodiment.

Whenever the terms "including" or "having" are used, these terms are meant to be equivalent to "comprising" as defined hereinabove.

Advantageous embodiments of the inventive use of the particulate solid carrier are defined in the corresponding dependent claims.

In one embodiment of the inventive method, the feed water has a concentration of dissolved magnesium ions of 10 mg/l or less, preferably 5 mg/l or less, and most preferably 2 mg/l or less.

In another embodiment of the inventive method, the feed water has a total alkalinity ($CaCO_3$) of from 5 to 200 mg/l, preferably from 10 to 150 mg/l, and most preferably from 20 to 100 mg/l.

In still another embodiment, the feed water has a Langelier Saturation Index (LSI) of from −2.0 to 1.0, preferably from −1.0 to 0.7, and most preferably from −0.5 to 0.5.

In still another embodiment, the inventive method further comprises a step of adjusting the pH of the feed water to a range of from 5.0 to 8.5, preferably from 5.5 to 8.0, and most preferably from 6.0 to 7.5, wherein said pH is preferably adjusted by injecting an appropriate amount of carbon dioxide into inlet flow $Q_{IN}$.

In still another embodiment, the inventive method further comprises a step of adjusting the temperature of the feed water to a range of from 5 to 35° C., preferably from 10 to 30° C., and most preferably from 15 to 25° C.

In another embodiment of the inventive method, the magnesium ion source is synthetic hydromagnesite, preferably precipitated hydromagnesite.

In still another embodiment of the inventive method, the particles have a weight median particle size in the range of from 0.05 to 20 mm, preferably from 0.1 to 15 mm, more preferably from 0.15 to 10 mm, still more preferably from 0.2 to 2 mm, and most preferably from 0.5 to 1.5 mm.

In still another embodiment of the inventive method, the contact time in step (b) between flow $Q_{IN}$ and the solid bed is:

(i) at least 0.05 min, preferably at least 0.1 min, more preferably at least 0.2 min, and most preferably at least 0.25 min; and/or (ii) less than 10 min, preferably less than 5 min, more preferably less than 2 min, and most preferably less than 1 min.

In still another embodiment of the inventive method, the solid bed in step (b) is provided by a cavity of a flow reactor, said flow reactor having an inlet being configured to receive the inlet flow of feed water $Q_{IN}$ and an outlet being configured to release the outlet flow of treated water $Q_{OUT}$, preferably said flow reactor is a flow cartridge.

In a preferred embodiment of the inventive method, the magnesium ion source is synthetic hydromagnesite, preferably precipitated hydromagnesite, the particles have a weight median particle size in the range of from 0.5 to 1.5 mm, and the contact time in step (b) between flow $Q_{IN}$ and the solid bed is at least 0.05 min and less than 1 min.

In another embodiment, the inventive method further comprises a step of adjusting the pH of the outlet flow of treated water $Q_{OUT}$, preferably to a range of from 4.5 to 9.5, preferably from 6.5 to 8.5, and most preferably from 6.8 to 7.5.

In one embodiment of the inventive water treatment system, the magnesium ion source is synthetic hydromagnesite, preferably precipitated hydromagnesite.

In another embodiment of the inventive water treatment system, the particles have a weight median particle size in the range of from 0.05 to 20 mm, preferably from 0.1 to 15 mm, more preferably from 0.15 to 10 mm, still more preferably from 0.2 to 2 mm, and most preferably from 0.5 to 1.5 mm.

In still another embodiment of the inventive water treatment system, the solid bed is provided by a cavity of a flow reactor, said flow reactor having an inlet being configured to receive the inlet flow of feed water $Q_{IN}$ and an outlet being configured to release the outlet flow of treated water $Q_{OUT}$, preferably said flow reactor is a flow cartridge.

In one embodiment of the inventive flow reactor, the magnesium ion source is synthetic hydromagnesite, preferably precipitated hydromagnesite.

In another embodiment of the inventive flow reactor, the particles have a weight median particle size in the range of from 0.05 to 20 mm, preferably from 0.1 to 15 mm, more preferably from 0.15 to 10 mm, still more preferably from 0.2 to 2 mm, and most preferably from 0.5 to 1.5 mm.

In still another embodiment of the inventive flow reactor, the solid bed is provided by a cavity of said flow reactor.

In still another embodiment of the inventive flow reactor, the flow reactor is a flow cartridge.

In the following, details and preferred embodiments of the inventive method will be disclosed. It is to be understood that these details and embodiments also apply to the inventive water treatment system as well as the inventive flow reactor, and where appropriate, vice versa.

(A) Provision of Feed Water

In step (a) of the method according to the present invention, an inlet flow of feed water $Q_{IN}$ is provided.

In general, the feed water may be any type of water, that is essentially free from impurities, preferably free from impurities, and contains no or only low concentrations of magnesium ions. More preferably, the feed water is essentially free from or free from pathogens and dirt particles.

In one embodiment, the feed water has a concentration of dissolved magnesium ions of 10 mg/l or less, preferably 5 mg/l or less, and most preferably 2 mg/l or less.

In an exemplary embodiment, the feed water is water being essentially free from, preferably free from, pathogens and dirt particles and having a concentration of dissolved magnesium ions of 10 mg/l or less, preferably 5 mg/l or less, and most preferably 2 mg/l or less.

As the inventive method is not limited to water from a specific source, it may be used to treat drinking water having a low magnesium concentration, demineralized or deionized water (e.g., water from reverse osmosis), or partially remineralized water.

The conductivity may be used as an indicator for the mineralization of water: the purer the water, the lower the conductivity. The conductivity can be measured with a conductivity meter and is specified in μS/m.

In one embodiment, the feed water is demineralized or deionized water, preferably reverse osmosis water (RO water).

However, the method of the present invention may also be applied to other types of water which contain no or only little magnesium. Especially, the method may be used to replenish magnesium in drinking water which includes drinking water from natural sources (e.g., surface fresh water or ground water) as well as drinking water obtained by remineralization of purified water, such as demineralized or deionized water.

Most remineralization methods are concerned with the replenishment of calcium in demineralized or deionized water while the existing prior art is less concerned with the replenishment of magnesium, let alone the replenishment of magnesium in water which is already suitable for use as drinking water.

The inventors of the present application have found, surprisingly, that the inventive method allows for the replenishment of magnesium in (pre-)mineralized water although this type of water may be considered as a stabilized system, for example in terms of total alkalinity, and although poorly soluble magnesium sources are used in order to avoid the introduction of unwanted anions, such as chloride or sulfate.

Therefore, in one embodiment of the present invention, the feed water is obtainable by remineralization of demineralized or deionized water with calcium.

In another embodiment, the feed water thus may have a total alkalinity a total alkalinity ($CaCO_3$) of from 5 to 200 mg/l, preferably from 10 to 150 mg/l, and most preferably from 20 to 100 mg/l.

In case the inventive method is used to treat stabilized aqueous systems, the feed water may have a Langelier Saturation Index (LSI) of from −2.0 to 1.0, preferably from −1.0 to 0.7, and most preferably from −0.5 to 0.5.

The inventive method was also found to be applicable to any type of feed water independently from whether said feed contains any specific concentration of carbon dioxide or any carbon dioxide at all. The amount or concentration of carbon dioxide referred to in this context is understood as the concentration of carbon dioxide as determined by titration with sodium hydroxide using a DGi111-SC pH electrode (Mettler-Toledo). The skilled person will appreciate that this titration method is suitable to determine the concentration of physically dissolved carbon dioxide.

Therefore, in one embodiment, the feed water provided in step (a) of the inventive method may have a concentration of carbon dioxide of less than 50 mg/l, preferably less than 20 mg/l, still more preferably less than 10 mg/l, preferably less than 5 mg/l, and most preferably in a range of from 0.1 to 2 mg/l.

(B) Solid Bed Reaction and Treated Water

In step (b) of the inventive method, feed water flow $Q_{IN}$ is passed through a solid bed to obtain an outlet flow of treated water $Q_{OUT}$.

The solid bed used in the method according to the present invention contains solid hydromagnesite particles which act as magnesium ion source. Upon passing through said solid bed, which represents a first phase being in solid physical state, the inlet flow $Q_{IN}$, which represents a second phase being in liquid physical state, interacts with the hydromagnesite particles wherein magnesium ions are released and dissolved in the feed water to form an outlet stream $Q_{OUT}$ of treated water having an increased magnesium ion concentration.

The magnesium ion source of the present invention is hydromagnesite, which includes both, natural and synthetic hydromagnesite. The term "synthetic hydromagnesite" as used herein refers to both, hydromagnesite obtained by conversion of natural minerals as well as to hydromagnesite obtained by chemical precipitation processes, wherein the latter may be a preferred embodiment.

Unlike highly water soluble magnesium salts, such as magnesium chloride or magnesium sulfate, solid materials having a solubility limit in water of 10 g/l or less, such as hydromagnesite, are particularly suitable for the purpose of the present invention. Hydromagnesite was proven to show a uniform and controlled dissolution under the conditions of the inventive method, thereby allowing for a uniform and controlled dosage of $Mg^{2+}$ into the flow of feed water $Q_{IN}$.

In one embodiment, the natural or synthetic hydromagnesite has a solubility limit in water of 5 g/l or less, preferably 2 g/l or less, more preferably 1 g/l or less, still more preferably 0.5 g/l or less, and most preferably 0.2 g/l or less, each measured at 20° C. and 100 kPa.

In a particular embodiment of the present invention, the magnesium ion source is synthetic hydromagnesite, wherein said synthetic hydromagnesite preferably has a solubility limit in water of 5 g/l or less, preferably 2 g/l or less, more preferably 1 g/l or less, still more preferably 0.5 g/l or less, and most preferably 0.2 g/l or less, each measured at 20° C. and 100 kPa.

The preparation of synthetic hydromagnesite is disclosed, for example, in WO 2011/054831 A1 assigned to the present applicant, hereby incorporated by reference.

Said synthetic or precipitated hydromagnesite may be prepared in an aqueous environment by a process comprising the steps of:
  (a) providing at least one magnesium oxide source;
  (b) providing gaseous carbon dioxide and/or carbonate-comprising anions;
  (c) slaking said magnesium oxide source of step (a) to convert the magnesium oxide at least partially into magnesium hydroxide;
  (d) contacting the obtained magnesium hydroxide of step (c) and said gaseous carbon dioxide and/or carbonate-comprising anions of step (b) to convert the magnesium hydroxide at least partially into precipitated nesquehonite; and
  (e) treating the obtained precipitated nesquehonite of step (d) in a heat-ageing step.

The following illustrative example involves the preparation of hydromagnesite by calcining and slaking white dolomite: White dolomite stones are crushed to yield a grain size of 10-50 mm and calcined in a rotary kiln at 1 050° C.

for 60 min. The resulting burned dolomite (CaO.MgO) is ground in a ball mill to obtain a powder having a median particle size of about 40 μm (CILAS laser diffraction method). Subsequently, 200 kg of said burned dolomite are slaked by adding to 1 000 liters of 50° C. tap water in a stirred reactor. The burned dolomite is slaked for 30 min under continuous stirring and the resulting suspension is adjusted to about 8 wt % solids content via dilution with water. The carbonation is conducted in a 1 800 l baffled cylindrical stainless steel reactor equipped with a gassing agitator, a stainless steel carbonation tube to direct a carbon dioxide/air gas stream to the impeller and probes for monitoring the pH and conductivity of the suspension. 1 800 l of the suspension obtained in the slaking step are adjusted to a temperature of 12° C. and added to the carbonating reactor. A gas mixture of 26 vol % carbon dioxide in air are then bubbled upwards through the slurry at a rate of 200 m³/h under a slurry agitation of 240 rpm. During the carbonation, the temperature of the reaction mix is allowed to rise due to heat generated in the exothermic reaction. After 85 min the introduction of gas is stopped. The suspension is then transferred to a pressurized vessel and heated to about 130° C. for 30 min. The obtained synthetic hydromagnesite is recovered as an aqueous slurry.

The inventors have found that the particle size of the solid particles may be used to control the reaction rate between $Q_{IN}$ and the magnesium ion source in step (b) of the instant method.

On the one hand, any comminution method known in the art may be used to decrease the particle size of said solid particles, for example by grinding. Optionally, the solid particles may be processed through a further treatment such as screening and/or fractionation, for example by a cyclone or classifier before using same in the solid bed of the present invention. On the other hand, if it is desired to increase the particle size (e.g., in case of a fine powder), any known granulation technique may be used in order to increase the particle sizes.

In order to ensure rapid and controlled magnesium replenishment, the particles used in the solid bed, in one embodiment of the invention, have a weight median particle size in the range of from 0.05 to 20 mm, preferably from 0.1 to 15 mm, more preferably from 0.15 to 10 mm, still more preferably from 0.2 to 2 mm, and most preferably from 0.5 to 1.5 mm or 0.3 to 1.2 mm. In a particularly preferred embodiment, the solid particles have a weight median particle size of about 0.5 mm.

The skilled person will recognize that the aforementioned reaction rate between $Q_{IN}$ and the magnesium ion source in step (b) may influence the final concentration of magnesium in the flow of treated water $Q_{OUT}$. Another parameter to control said final concentration of magnesium is the contact time between $Q_{IN}$ and the magnesium ion source in step (b), i.e. the contact time of $Q_{IN}$ in the solid bed. While short contact times may be preferred for economical and practical reasons, longer contact times may be advantageous to ensure a certain level of magnesium ions in the treated water.

Therefore, in one embodiment, the contact time in step (b) between flow $Q_{IN}$ and the solid bed is:
(i) at least 0.05 min, preferably at least 0.1 min, more preferably at least 0.2 min, and most preferably at least 0.25 min; and/or
(ii) less than 10 min, preferably less than 5 min, more preferably less than 2 min. and most preferably less than 1 min.

In a particular preferred embodiment of the present invention, the contact time is at least 0.05 min and less than 2 min, still more preferably in a range of from 0.1 min to 1 min.

The contact time between flow $Q_{IN}$ and the solid bed may be controlled, for example, by increasing or decreasing the flow rate or by adapting the dimensions (e.g. the length) of the solid bed.

In an exemplary embodiment of the present invention, the magnesium ion source is synthetic hydromagnesite, preferably precipitated hydromagnesite, the particles have a weight median particle size in the range of from 0.5 to 1.5 mm, and the contact time in step (b) between flow $Q_{IN}$ and the solid bed is at least 0.05 min and less than 2 min, preferably in a range of from 0.1 min to 1 min.

Independently from the type of feed water used in the inventive process, the treated water released from the solid bed as outlet flow $Q_{OUT}$ is a water having an increased magnesium ion concentration. Typically, the treated water is sufficiently mineralized to be used as drinking water.

In one embodiment, the treated water of outlet flow $Q_{OUT}$ has a concentration of dissolved magnesium ions of greater than 2 mg/l, preferably greater than 5 mg/l, and most preferably greater than 10 mg/l. In a preferred embodiment, the magnesium concentration is at least 15 mg/l, for example 15 to 150 mg/l.

The treated water may have a total alkalinity ($CaCO_3$) of from 1 to 500 mg/l, preferably from 5 to 200 mg/l, more preferably from 10 to 150 mg/l, and most preferably from 20 to 100 mg/l.

The inventors have also found, surprisingly, that the method allows for the provision of (drinking) water having a low turbidity. The term "turbidity" in the meaning of the present invention describes the cloudiness or haziness of a fluid caused by individual particles (suspended solids) that are generally invisible to the naked eye. The measurement of turbidity is a key test of water quality and can be carried out with a nephelometer. The units of turbidity from a calibrated nephelometer as used in the present invention are specified as Nephelometric Turbidity Units (NTU). In one embodiment of the present invention, the treated water of outlet flow $Q_{OUT}$ has a turbidity of less than 5.0 NTU, preferably less than 2.0 NTU, more preferably less than 1.0 NTU, and most preferably between 0.05 and 0.5 NTU.

In some embodiments, the treated water of the present invention is also characterized by a specific conductivity that is indicative for the total ion concentration. For example, the conductivity may be in a range of from 50 to 1 000 μS/cm, preferably from 80 to 500 μS/cm, and most preferably from 150 to 450 μS/cm.

(C) Optional Method Steps

Basically, the treated water of $Q_{OUT}$ obtained as in method step (b) is ready for use, for example as drinking water.

However, it possible to combine the inventive method with further optional treatment steps depending on the intended use and specific requirements.

Although filtration is not an essential requirement, the treated water of $Q_{OUT}$ may be sent to a filtration unit to remove any residual solids or other unwanted impurities. Therefore, in one embodiment, the method of the present invention further comprises a step of subjecting the outlet flow of treated water $Q_{OUT}$ to a filtration step.

Likewise, the pH of the treated water in outlet flow $Q_{OUT}$ may be adjusted depending on the specific needs. Therefore, in one embodiment, the method of the present invention further comprises a step of adjusting the pH of the treated water obtained in step (b). In a preferred embodiment, the method further comprises a step of adjusting the pH of the treated water obtained in step (b) to a range of from 6.5 to 9.5, preferably from 7.0 to 9.0, and most preferably from 7.5 to 8.5.

In order to control or modify (e.g. increase) the reaction rate between $Q_{IN}$ and the magnesium ion source in step (b), the inventive may further comprise as step of increasing the carbon dioxide concentration in the feed water of inlet flow $Q_{IN}$ before passing said flow $Q_{IN}$ through the solid bed in step (b).

The "concentration of carbon dioxide" referred to in the present application is meant to refer to the concentration of carbon dioxide as determined by titration with sodium hydroxide using a DGi111-SC pH electrode (Mettler-Toledo).

The increase of the carbon dioxide concentration should not be understood as to imply that the feed water of inlet flow $Q_{IN}$ contains a specific concentration of carbon dioxide. Indeed, the feed water may be free of carbon dioxide, for example it may have a concentration of carbon dioxide that is in a range from 0 to less than 5 mg/l.

In general, any conceivable method may be used to increase the concentration of carbon dioxide in the inlet flow of feed water $Q_{IN}$. Suitable methods include, without being limited to, injection of gaseous carbon dioxide into the inlet flow of feed water $Q_{IN}$ or contacting the inlet flow of feed water $Q_{IN}$ with an acidic cation exchanger.

Accordingly, in one embodiment, the concentration of carbon dioxide is increased before step (b) by injecting gaseous carbon dioxide into the inlet flow $Q_{IN}$ or by contacting the inlet flow of feed water $Q_{IN}$ with an acidic cation exchanger.

While the injection of gaseous carbon dioxide is suitable to increase the carbon dioxide concentration of any kind of feed water, the use of a acidic cation exchanger works best with feed water showing a certain degree of alkalinity:

$$M^+HCO_3^- \rightarrow H^+HCO_3^- \leftrightarrow H_2O + CO_2$$

As may be gathered from the foregoing equation, the exchange of protons ($H^+$), bound to the functional groups of the cation exchanger, with the cations ($M^+$) in the water that have greater affinity to the resin (e.g. calcium ions) cause a decrease in the pH of the water and result in an increase in amount of carbonic acid, due to the presence of alkalinity in the water.

Thus, in a preferred embodiment, the concentration of carbon dioxide may be increased before step (b) by contacting the inlet flow of feed water $Q_{IN}$ with a weakly acidic cation exchanger, wherein the feed water has a has a total alkalinity ($CaCO_3$) of from 5 to 200 mg/l, preferably from 10 to 150 mg/l, and most preferably from 20 to 100 mg/l.

Typically, weakly acidic cation exchangers feature carboxylic groups as functional units. Typically, strongly acidic cation exchangers feature sulfonic acid groups. In a preferred embodiment of the present invention, the acidic cation exchanger is a weakly acidic cation exchanger. Such ion exchangers are well known to the skilled person.

In a particularly preferred embodiment, the concentration of carbon dioxide may be increased before step (b) by injecting gaseous carbon dioxide into the inlet flow $Q_{IN}$. This variant is well suitable for increasing the carbon dioxide concentration of any conceivable type of feed water, including untreated water (e.g., surface fresh water or ground water), demineralized or deionized water or remineralized water. Methods and devices for injecting carbon dioxide are generally known to the skilled person.

The gaseous carbon dioxide may be obtained from a storage tank (e.g. a gas cylinder), in which it is held in the liquid phase. Depending on the consumption rate of carbon dioxide and the environment either cryogenic or conventionally insulated tanks may be used. The conversion of the liquid carbon dioxide into the gaseous carbon dioxide can be done using an air heated vaporizer, or an electrical or steam based vaporizing system. If necessary, the pressure of the gaseous carbon dioxide can be reduced prior to the injection step, e.g., by using a pressure reducing valve. Compressed air/carbon dioxide mixture may also be used.

As the present invention is particularly useful in household installations, the gaseous carbon dioxide is preferably provided by a pressure tank, such as a canister, which contains compressed gaseous carbon dioxide.

The gaseous carbon dioxide can be injected into the inlet flow of feed water $Q_{IN}$ at a controlled rate, forming a dispersion of carbon dioxide bubbles in the stream and allowing the bubbles to dissolve therein. For example, the dissolution of carbon dioxide in the feed water can be facilitated by injecting same at a turbulent region of the inlet flow $Q_{IN}$, wherein the turbulence can be created by a constriction in the pipeline. For example, the carbon dioxide may be introduced into the throat of a Venturi nozzle installed in the pipeline. The narrowing of the cross sectional area of the pipeline at the throat of the Venturi nozzle creates a turbulent flow of sufficient energy to break up the carbon dioxide into relatively small bubbles, thereby facilitating the dissolution.

In one embodiment, the carbon dioxide is injected under pressure into the inlet flow of feed water $Q_{IN}$. According to another embodiment of the present invention, the dissolution of carbon dioxide in the feed water is facilitated by a static mixer or a sparger, such as a porous metal sparger.

A flow control valve or other means may be used to control the injection rate of carbon dioxide into the inlet flow $Q_{IN}$. For example, a carbon dioxide dosing block and a carbon dioxide in-line measuring device may be used to control the rate of carbon dioxide flow. The flow rate of carbon dioxide thus may be used to control the final carbon dioxide concentration of the carbon dioxide-containing flow $Q_{CO2}$ or other parameters, such as pH.

The carbon dioxide content in flow $Q_{IN}$ may be adjusted to a specific concentration in order to ensure the rapid and effective replenishment of magnesium in the subsequent method step (b). In case of injection of gaseous carbon dioxide, the skilled person will appreciate that the concentration of carbon dioxide may be adjusted by regulating the carbon dioxide pressure and flow as described above. If a acidic cation exchanger is used, the level of carbon dioxide may be regulated, for example, by the contact time between the inlet flow of feed water $Q_{IN}$ and the ion exchange device which may depend, for example, on the flow rate and the length of the ion exchange column.

Independently from the method used to increase the concentration of carbon dioxide, said concentration in the feed water of flow $Q_{IN}$ may be adjusted to a concentration of from 5 to 500 mg/l, preferably 10 to 200 mg/l, and most preferably from 20 to 100 mg/l. Preferably, injection of gaseous carbon dioxide is used to adjust the concentration of carbon dioxide in the feed water of flow $Q_{IN}$.

The pH value may also be used to control the reaction rate between $Q_{IN}$ and the magnesium ion source in step (b) of the inventive method. In one embodiment, the pH of feed water of flow $Q_{IN}$ is therefore adjusted to a range of from 5.0 to 8.5, preferably from 5.5 to 8.0, and most preferably from 6.0 to 7.5. In a preferred embodiment, said pH is adjusted by injecting an appropriate amount of carbon dioxide into inlet flow $Q_{IN}$ as described above.

Likewise, the temperature may be used to control the reaction rate between $Q_{IN}$ and the magnesium ion source in step (b). Therefore, in another embodiment of the inventive method, the temperature of the feed water of flow $Q_{IN}$ is adjusted to a range of from 5 to 35° C., preferably from 10 to 30° C., and most preferably from 15 to 25° C.

(D) The Water Treatment System and the Flow Reactor

The method according to the present invention for increasing the magnesium ion concentration of feed water may be carried out by means of a corresponding water treatment system or by use of a corresponding flow reactor.

Therefore, another aspect of the present invention relates to a water treatment system, said system comprising:
(i) an inlet, the inlet being configured to receive an inlet flow of feed water $Q_{IN}$;
(ii) a solid bed, the solid bed being configured to receive the inlet flow of feed water $Q_{IN}$ from said inlet and to obtain an outlet flow of treated water $Q_{OUT}$; and
(iii) an outlet being configured to release the outlet flow of treated water $Q_{OUT}$;
characterized in that the solid bed comprises a magnesium ion source in the form of solid particles, wherein said magnesium ion source is natural or synthetic hydromagnesite.

The line being configured to receive the inlet flow of feed water $Q_{IN}$ can be made from any material which is compatible with the feed water. For example, said line may comprise a metal pipe or a plastic pipe. Said line may further comprise a connector to connect the line with an external feed water supply, for example a drinking water supply or the outlet of a water purification system. The line may comprise additional connectors for connecting, for example for connecting the solid bed or for installing an optional pretreatment device.

In one embodiment, the water treatment of the present invention further comprises a pretreatment device connected to said line upstream from the solid bed, wherein said pretreatment device is configured to increase the concentration of carbon dioxide in said inlet flow of feed water $Q_{IN}$.

As already described above, different methods and corresponding devices may used to increase the carbon dioxide concentration. Suitable methods include, without being limited to, injection of gaseous carbon dioxide or contacting the inlet flow of feed water $Q_{IN}$ with an acidic cation exchanger, preferably with a weakly acidic cation exchanger.

Accordingly, in one embodiment, the pretreatment device connected to said line is:
(i) an injection device configured to inject gaseous carbon dioxide into said inlet flow $Q_{IN}$; or
(ii) an acidic cation exchanger, preferably a weakly acidic cation exchanger, configured to receive the inlet flow of feed water $Q_{IN}$.

Preferably, the pretreatment device connected to said line is an injection device configured to inject gaseous carbon dioxide into said inlet flow $Q_{IN}$. Details and embodiments regrading suitable carbon dioxide injection devices for use in the present invention are described hereinabove and accordingly apply to the inventive water treatment system.

The inlet flow $Q_{IN}$ is then directed to a solid bed. If applicable, the solid bed is located downstream from said pretreatment device. In either case, the solid bed is configured to receive the inlet flow of feed $Q_{IN}$.

The solid bed used in the present invention can have any conceivable construction allowing to pass the inlet flow $Q_{IN}$ in order to interact with the solid particles such that magnesium ions are released upon dissolution of said solid particles. It may also be desirable to prevent washout of particulate material, especially larger particles. For this purpose, in one embodiment, the solid bed further comprises a retention device at the downstream end of the solid bed, preferred retention devices are screens or water permeable membranes.

According to the present invention, the solid bed may be provided by a cavity of a flow reactor, said flow reactor having an inlet being configured to receive the flow of feed water $Q_{IN}$ and an outlet being configured to release the outlet flow of treated water $Q_{OUT}$, preferably said flow reactor is a flow cartridge.

Therefore, still another aspect of the present invention relates to a flow reactor, preferably a flow cartridge, for use in a water treatment system for increasing the magnesium ion concentration of feed water, said flow reactor comprising:
(i) a line, the line being configured to receive an inlet flow of feed water $Q_{IN}$; and
(ii) a solid bed, the solid bed being configured to receive the inlet flow of feed water $Q_{IN}$ from said line to obtain an outlet flow of treated water $Q_{OUT}$;
characterized in that the solid bed comprises a magnesium ion source in the form of solid particles, wherein said magnesium ion source is natural or synthetic hydromagnesite.

The flow cartridge may be a closed container configured to comprise a cavity which includes the magnesium ion source in the form of solid particles forming a solid bed, wherein said cartridge has an inlet to receive the inlet flow of feed water $Q_{IN}$ and an outlet being configured to release an outlet flow of treated water $Q_{OUT}$.

In a further embodiment, the flow reactor or flow cartridge comprises a retention device at the outlet of the reactor, preferably a screen or water permeable membrane.

The flow reactor or flow cartridge is connected to the line receiving the inlet flow of feed water $Q_{IN}$, if applicable downstream from the pretreatment device, by means of a connector attached at the inlet of the reactor or cartridge. A further connector may be attached at the downstream end of the outlet. This may allow for a simple replacement of the flow reactor or flow cartridge when installed in pipeline systems, for example in domestic water supply systems or mobile water treatment plants.

It is noted that the details and embodiments disclosed hereinabove with regard to the inlet flow of feed water $Q_{IN}$ and the solid bed accordingly apply to the inventive water treatment system and the flow reactor or flow cartridge.

For example, in some embodiments of the water treatment system and the flow reactor, the magnesium ion source is synthetic hydromagnesite, preferably precipitated hydromagnesite.

In other embodiments of the water treatment system and the flow reactor, the particles of the solid bed have a weight median particle size in the range of from 0.05 to 20 mm, preferably from 0.1 to 15 mm, more preferably from 0.15 to 10 mm, still more preferably from 0.2 to 2 mm, and most preferably from 0.5 to 1.5 mm.

In other embodiments of the water treatment system and the flow reactor, the solubility limit in water is 5 g/l or less, preferably 2 g/l or less, more preferably 1 g/l or less, still more preferably 0.5 g/l or less, and most preferably 0.2 g/l or less, each measured at 20° C. and 100 kPa.

In exemplary embodiments of the water treatment system and the flow reactor, the magnesium ion source is synthetic hydromagnesite, preferably precipitated hydromagnesite, the particles have a weight median particle size in the range of from 0.5 to 1.5 mm, and the contact time in step (b)

between flow $Q_{IN}$ and the solid bed is at least 0.05 min and less than 2 min. preferably in a range of from 0.1 min to 1 min.

EXAMPLES

The scope and interest of the invention may be better understood on basis of the following examples which are intended to illustrate embodiments of the present invention.

(A) Analytical Methods

All parameters defined throughout the present application and mentioned in the following examples are based on the following measuring methods:

Metal Ion Concentrations (e.g. $Ca^{2+}$ or $Mg^{2+}$)

The metal ion concentrations indicated in this application, including the magnesium and calcium ion concentration were measured by ion chromatography using a Metrohm 882 Compact IC plus instrument. All samples were filtered (RC—0.20 μm) prior to analysis.

Carbon Dioxide Concentration

The concentration of dissolved carbon dioxide in water was determined by titration using an aqueous sodium hydroxide standard solution as titrant and a DGi111-SC pH electrode (Mettler-Toledo).

Particle Size Distributions

For determining the weight media particle size of solid particles, fractional sieving according to the ISO 3310-1: 2000(E) standard was used.

Conductivity

The electrical conductivity was measured using a Seven-Multi pH meter from Mettler-Toledo (Switzerland) equipped with an InLab 741 probe from Mettler-Toledo (Switzerland).

Total Alkalinity ($CaCO_3$)

The total alkalinity was measured with a Mettler-Toledo T70 Titrator using the corresponding LabX Light Titration software. A DGi111-SG pH electrode was used for this titration according to the corresponding Mettler-Toledo method M415 of the application brochure 37 (water analysis). The calibration of the pH electrode was performed using Mettler-Toledo pH standards (pH 4.01, 7.00 and 9.21).

Turbidity

The turbidity was measured with a Hach Lange 2100AN IS Laboratory turbidity meter. Calibration was performed using StabCal turbidity standards (formazin) of having <0.1, 20, 200, 1000, 4 000 and 7 500 NTU.

Solubility Limit

The solubility limit is determined by the shake flask method known to the skilled person. According to this method, excess compound (e.g. the magnesium ion source) is added to the solvent (e.g. water, preferably deionized water) and shaken at 20° C. and 100 kPa ambient pressure for at least 24 h. The saturation is confirmed by observation of the presence of undissolved material. After filtration of the slurry, a sample of the solution having a defined volume is taken for analysis. Filtration is performed under the conditions used during dissolution (20° C., 100 kPa) to minimize loss of volatile components. The solvent of the sample was then evaporated and the mass concentration of dissolved compound was determined based on the mass of the residual compound after evaporation of the solvent and the sample volume.

In many cases, solubility limits of active ingredients are available in public databases generally known to the skilled person. In case of any differences or inconsistencies, the solubility limit determined according to the method described hereinabove shall be preferred.

(B) Examples

The following examples are not to be construed to limit the scope of the claims in any manner whatsoever.

Equipment

The following equipment was used in the trials:
1. Contactor system:
    A contactor column constructed from DN80 clear PVC equipped with barrel union end connectors to allow for changing of filter material within the column
    Pump with variable speed control to deliver feed water at required flow rate
    Carbon dioxide dosing sparger to dissolve carbon dioxide into feed water
    Flow measurements with online flow meter
    Flow control with rate tube and needle valve to column
    Online measurement of pH, turbidity, and conductivity on inlet and outlet of column
2. Carbon dioxide dosing system (not used in these trials), consisting of:
    Carbon dioxide bottle
    Pressure regulator to decrease pressure from bottle at 50 bar to 5 bar
    Mass flow meter and control valve to regulate and measure the dosing of carbon dioxide
    Dosing connection to dissolution sparger in feed pipework to column Procedure The following procedure was used to run the trials:
1. Contactor columns were filled with the magnesium ion source as indicated below (filled to a bed height of about 200 mm)
2. Water that had been treated with reverse osmosis and then stabilized using a calcite contactor was used as feed water $Q_{IN}$ and pumped through the contactor column (the mineral composition and quality of feed water is indicated hereinbelow)
3. Feed water was run through the column for a period of at least two EBCT (empty bed contact time) to condition the column before taking samples for analysis from the outlet flow $Q_{OUT}$
4. Trials were conducted with various flow rates to compare the impact of contact time Materials The following magnesium minerals was tested as magnesium ion source in the trials:

| Mg ion source | Chemical formula | Particle size | Origin or supplier |
|---|---|---|---|
| PHM | $Mg_5(CO_3)_4(OH)_2 \cdot 4H_2O$ | 500 gm | As described in WO 2011/054831 A1 |

PHM = precipitated hydromagnesite.

The chemical composition of PHM was confirmed by XRD (results not shown).

Test Settings

The following test settings were used in the trials using premineralized RO water which, however, was low in magnesium.

|  | Trial # | | | | |
| --- | --- | --- | --- | --- | --- |
|  | 1 | 2 | 3 | 4 | 5 |
| Premineralization | Y | Y | Y | Y | Y |
| Mg ion source | PHM | PHM | PHM | PHM | PHM |
| Bed height [mm] | 200 | 200 | 41 | 41 | 41 |
| Column Ø [mm] | 68 | 68 | 68 | 68 | 68 |
| $CO_2$ dose [mg/l] | 0 | 0 | 0 | 0 | 0 |
| Flow [l/h] | 21.8 | 43.6 | 12 | 18 | 36 |
| Contact time [min] | 2 | 1 | 0.75 | 0.5 | 0.25 |

Test Results

The below table lists the results measured in Trials 1-5:

|  | Trial # | | | | | | | | | |
| --- | --- | --- | --- | --- | --- | --- | --- | --- | --- | --- |
|  | 1 | | 2 | | 3 | | 4 | | 5 | |
| Sample point | $Q_{IN}$ | $Q_{OUT}$ | $Q_{IN}$ | $Q_{OUT}$ | $Q_{IN}$ | $Q_{OUT}$ | $Q_{IN}$ | $Q_{OUT}$ | $Q_{IN}$ | $Q_{OUT}$ |
| pH value | 6.75 | 10 | 6.76 | 9.8 | 7.06 | 9.66 | 7 | 9.6 | 7.06 | 9.49 |
| T [° C.] | 21.2 | 21.9 | 20.9 | 21.8 | 22.5 | 23.3 | 22.3 | 23.2 | 22.5 | 23.2 |
| Conductivity [µS/cm] | 137 | 296 | 140 | 253 | 208 | 279 | 208 | 273 | 205 | 259 |
| TAC [mg/l $CaCO_3$] | 79 | 192 | 84 | 157 | 110 | 177 | 110 | 170 | 122 | 159 |
| Free $CO_2$ [mg/l] | 11 | 0 | 11 | 0 | 4 | 0 | 4 | 0 | 4 | 0 |
| Turbidity [NTU] | 0.1 | 0.1 | 0.2 | 0.1 | 0.1 | 0.1 | 0.1 | 0.1 | 0.1 | 0.1 |
| $Mg^{2+}$ [mg/l] | <1 | 60 | <1 | 46 | <1 | 34.5 | <1 | 29 | <1 | 26 |

The trials with hydromagnesite worked very effectively without injection of carbon dioxide. A large increase in the dissolved magnesium level, the alkalinity level, the pH level and full consumption of the carbon dioxide suggest a very rapid reaction rate.

The invention claimed is:

1. A method for increasing the magnesium ion concentration of feed water, the method comprising the following steps:
   (a) providing an inlet flow of feed water $Q_{IN}$;
   (b) passing said flow $Q_{IN}$ through a solid bed to obtain an outlet flow of treated water $Q_{OUT}$;
   wherein the solid bed in step (b) comprises a magnesium ion source in the form of solid particles, wherein said magnesium ion source is natural or synthetic hydromagnesite.

2. The method according to claim 1, wherein the feed water has a concentration of dissolved magnesium ions of 10 mg/l or less.

3. The method according to claim 1, wherein the feed water has a total alkalinity ($CaCO_3$) of from 5 to 200 mg/l.

4. The method according to claim 1, wherein the feed water has a Langelier Saturation Index (LSI) of from −2.0 to 1.0.

5. The method according to claim 1, wherein the method further comprises a step of adjusting the pH of the feed water to a range of from 5.0 to 8.5, wherein said pH is adjusted by injecting an appropriate amount of carbon dioxide into inlet flow $Q_{IN}$.

6. The method according to claim 1, wherein the method further comprises a step of adjusting the temperature of the feed water to a range of from 5 to 35° C.

7. The method according to claim 1, wherein the magnesium ion source is synthetic hydromagnesite.

8. The method according to claim 1, wherein the particles have a weight median particle size in the range of from 0.05 to 20 mm.

9. The method according to claim 1, wherein the contact time in step (b) between flow $Q_{IN}$ and the solid bed is:
   (i) at least 0.05 min; and/or
   (ii) less than 10 min.

10. The method according to claim 1, wherein the solid bed in step (b) is provided by a cavity of a flow reactor, said flow reactor having an inlet being configured to receive the inlet flow of feed water $Q_{IN}$ and an outlet being configured to release the outlet flow of treated water $Q_{OUT}$.

11. The method according to claim 1, wherein the magnesium ion source is synthetic hydromagnesite and the particles have a weight median particle size in the range of from 0.5 to 1.5 mm, and the contact time in step (b) between flow $Q_{IN}$ and the solid bed is at least 0.05 min and less than 2 min.

12. The method according to claim 1, wherein the method further comprises a step of adjusting the pH of the outlet flow of treated water $Q_{OUT}$ to a range of from 4.5 to 9.5.

13. The method according to claim 1, wherein the feed water has a concentration of dissolved magnesium ions of 2 mg/l or less, a total alkalinity ($CaCO_3$) of from 20 to 100 mg/l, and a Langelier Saturation Index (LSI) of from −1.0 to 0.7.

14. The method according to claim 1, further comprising adjusting the pH of the feed water to a range of from 6.0 to 7.5, the temperature of the feed water to a range of from 15 to 25° C., and the pH of the outlet flow of treated water $Q_{OUT}$ to a range of from 6.8 to 7.5.

15. The method according to claim 1, wherein the magnesium ion source is precipitated hydromagnesite particles having a weight median particle size in the range of from 0.5 to 1.5 mm.

16. A water treatment system for increasing the magnesium ion concentration of feed water, the system comprising:
   (i) a line, the line being configured to receive an inlet flow of feed water $Q_{IN}$; and
   (ii) a solid bed, the solid bed being configured to receive the inlet flow of feed water $Q_{IN}$ from said line to obtain an outlet flow of treated water $Q_{OUT}$;
   wherein the solid bed comprises a magnesium ion source in the form of solid particles, wherein said magnesium ion source is natural or synthetic hydromagnesite.

17. The water treatment system according to claim 16, wherein:
   (i) the magnesium ion source is synthetic hydromagnesite;
   (ii) the particles have a weight median particle size in the range from 0.05 to 20 mm; and/or
   (iii) the solid bed is provided by cavity of a flow reactor having an inlet being configured to receive the inlet flow of feed water $Q_{IN}$ and an outlet being configured to release the outlet flow of treated water $Q_{OUT}$.

18. A flow reactor for use in a water treatment system for increasing the magnesium ion concentration of feed water, said flow reactor comprising:

(i) an inlet, the inlet being configured to receive an inlet flow of feed water $Q_{IN}$;

(ii) a solid bed, the solid bed being configured to receive the inlet flow of feed water $Q_{IN}$ from said inlet and to obtain an outlet flow of treated water $Q_{OUT}$; and (iii) an outlet being configured to release the outlet flow of treated water $Q_{OUT}$;

wherein the solid bed comprises a magnesium ion source in the form of solid particles, wherein said magnesium ion source is natural or synthetic hydromagnesite.

19. The flow reactor according to claim 18, wherein:

(i) the magnesium ion source is precipitated hydromagnesite;

(ii) the particles have a weight median particle size in the range from 0.05 to 20 mm; and/or (iii) the solid bed is provided by cavity of said flow reactor.

20. The flow reactor according to claim 18, wherein the flow reactor is a flow cartridge.

\* \* \* \* \*